US 12,493,683 B1

(12) United States Patent
Gupta et al.

(10) Patent No.: US 12,493,683 B1
(45) Date of Patent: Dec. 9, 2025

(54) MEANS AND METHODS OF DYNAMICALLY GENERATING AND AUTHENTICATING PASSWORDS

(71) Applicant: LIGHTNING STRIKE INC, San Francisco, CA (US)

(72) Inventors: Rajesh K. Gupta, San Francisco, CA (US); Rajat Randev, San Francisco, CA (US); Minal Shanghavi, San Francisco, CA (US)

(73) Assignee: Lightning Strike Inc., San Francisco, CA (US)

( * ) Notice: Subject to any disclaimer, the term of this patent is extended or adjusted under 35 U.S.C. 154(b) by 200 days.

(21) Appl. No.: 18/220,787

(22) Filed: Jul. 11, 2023

Related U.S. Application Data (60) Provisional application No. 63/393,598, filed on Jul. 29, 2022.

(51) Int. Cl.
  *G06F 21/46* (2013.01)
(52) U.S. Cl.
  CPC ................... *G06F 21/46* (2013.01)
(58) Field of Classification Search
  CPC ...................................... G06F 21/46
  See application file for complete search history.

(56) References Cited

U.S. PATENT DOCUMENTS

| | | | |
|---|---|---|---|
| 7,021,534 B1* | 4/2006 | Kiliccote | H04L 51/56 713/170 |
| 9,350,548 B2* | 5/2016 | Bagley | H04L 9/3242 |
| 9,626,506 B1* | 4/2017 | Shetty | H04L 63/0846 |
| 9,798,872 B2* | 10/2017 | Shetty | G06F 16/90344 |
| 11,914,698 B2* | 2/2024 | Bravo | G06F 21/604 |
| 2012/0047563 A1* | 2/2012 | Wheeler | H04L 9/0872 726/6 |
| 2013/0055372 A1* | 2/2013 | Chao | H04L 63/083 726/7 |

(Continued)

OTHER PUBLICATIONS

Al Maqbali F, Mitchell CJ. AutoPass: An automatic password generator. In2017 International Carnahan Conference on Security Technology (ICCST) Oct. 2, 20173 (pp. 1-6). IEEE. (Year: 2017).*

*Primary Examiner* — James R Turchen
(74) *Attorney, Agent, or Firm* — Steven A. Nielsen; www.NielsenPatents.com (57) ABSTRACT

The disclosed embodiments contemplate consumers who wish to securely login to a business/vendor without the need to remember or even know the password. A business/vendor wishes to conduct business with a verified consumer without the business undertaking the burden to keep a database of their customer's usernames and passwords. A system operator or third party security service provides mechanisms of authentication to verify the purported identity of consumers and businesses. To open a channel of communication between a verified consumer and business, a system operator or verification service sends systematic parameters or other data structures such at a designated consumer and business will independently create the appropriate login information and temporary password to facilitate a transaction. Passwords and login information are never transmitted between the provider and business/vendor, hence preventing outside parties from accessing unauthorized login information.

4 Claims, 3 Drawing Sheets

(56) References Cited

U.S. PATENT DOCUMENTS

| | | | |
|---|---|---|---|
| 2015/0207790 A1* | 7/2015 | Lu .......................... | G06F 21/44 |
| | | | 726/9 |
| 2017/0308695 A1* | 10/2017 | Adams .................... | H04L 63/06 |
| 2019/0141041 A1* | 5/2019 | Bhabbur ............... | H04L 9/3228 |
| 2020/0327220 A1* | 10/2020 | Daetz ....................... | G06F 21/31 |
| 2021/0012401 A1* | 1/2021 | Osborn ................... | H04W 4/80 |
| 2021/0240815 A1* | 8/2021 | Tsou ....................... | G06F 21/46 |
| 2021/0279324 A1* | 9/2021 | Orozco Cervantes ...................... | |
| | | | H04L 9/3226 |
| 2022/0376917 A1* | 11/2022 | Wang .................... | H04L 9/3226 |
| 2024/0202311 A1* | 6/2024 | Hsu ......................... | G06F 21/31 |

\* cited by examiner

MEANS AND METHODS OF DYNAMICALLY GENERATING AND AUTHENTICATING PASSWORDS

CROSS-REFERENCE TO RELATED APPLICATIONS

This utility application claims the benefit and priority date of provisional patent application 63/393,598 filed on Jul. 29, 2022, the contents of which are incorporated herein be reference.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to the creation, distribution and authentication of passwords. More particularly, the invention relates to means and methods of creating passwords for consumers wherein the passwords do not need to be remembered or recorded by a consumer with said passwords conveyed to and used by or mapped by a vendor for authentication. A service provider facilitates the transmission, mapping, secrecy and authentication of dynamic passwords.

(2) Description of the Related Art

The known related art fails to anticipate or disclose the principles of the present invention.

In the related art, the generation and distribution of passwords are known, but the related art fails to disclose or anticipate the mechanisms and/or protocols of the disclosed embodiments.

BRIEF SUMMARY OF THE INVENTION

The present invention overcomes shortfalls in the related art by presenting an unobvious and unique combination and configuration of methods and components to enable a consumer to seamlessly generate and use passwords that do not need to be remembered and are recognized and known by the intended vendor only.

In a disclosed embodiment, a consumer may login into a system interface and be presented with a listing of businesses subscribing to a disclosed embodiment. The consumer may be presented with login forms and user IDs associated with the business login forms. A disclosed system, may, in the background, receive confirmation from the business regarding each business login form, user IDs and mapped user tokens.

A user or consumer may be presented with an interface to generate a password and copy the password into a business login form. This method may be considered a manual login.

A user or consumer may also be presented with an interface to automatically generate a password and automatically submit the password to the business login form and/or subscribing business.

In the background, or within system servers and databases, a password is generated using dynamic secret parameters with varying algorithms. Each algorithm will have an algorithm ID to identify the algorithm uniquely. Before a system generated password is shared with User, a different set of parameters are generated using the aforementioned dynamic secret parameters. These generated different set of parameters, along with the algorithm ID to be used by the business and User token are transmitted to the business. The business then uses the received parameters to generate the same password generated previously generated on the consumer interface. The business will then hash this password and save any relevant data the business chooses to its database. The business may or may not set an expiration time for the usage of the generated password.

A disclosed embodiment shares the generated password with User or submits the business login form with User ID and password.

When the login form is submitted manually or automatically the login contains the User ID and system password, the business reviews the data received from the business login form and authenticates the User using its User ID and system password compared against the saved hashed password and User ID.

The generated password is unique every subsequent time hence not allowing anyone, be it the system service, Business, Users or any 3rd party to know what the next generated password will be.

These and other objects and advantages will be made apparent when considering the following detailed specification when taken in conjunction with the drawing.

REFERENCE NUMERALS IN THE DRAWINGS 100 a system in general
200 functions and flow charts for a consumer using a browser to interact with a disclosed embodiment
210 a consumer sometimes using a disclosed embodiment
205 a consumer accesses a business URL or other secured devices, facilities or applications needing authentication
215 a user or consumer 210 visiting a business 510 URL or website or other secured devices, facilities or applications needing authentication 220 a user or consumer provides ID or identification information
222 a decision juncture, if a consumer logged in from an app, a direct login option, if not a display dynamic password option 225 is presented
225 display dynamic password option, if yes a click display dynamic password 310 is presented, if no an enter static password 230 option is presented
235 submit user ID, password and authmode or authentication mode for authentication
240 enter dynamic password
250 display result
260 and end point
300 functions and flow charts that may be provided within an application by a system operator or provider enabling the disclosed embodiments 305 direct login option from a provider app
310 click display dynamic password
320 create and submit a POST HTTP_REQUEST to open the browser or associated application of business login form with user ID, dynamic password and authmode for authentication
325 display or login decision diamond
330 display dynamic password
400 functions, services and flow charts implemented by a provider or system operator enabling the disclosed embodiments
410 a provider or system operator of the disclosed embodiments
415 "Active handshake exists?" decision diamond
420 generate dynamic password and secret token using user token and other parameters
430 send relevant parameters to recreate dynamic password
500 functions and flow charts implemented by a business or vendor subscribing or otherwise participating in a disclosed embodiment
510 a business or vendor sometimes using a disclosed embodiment
520 recreate and save dynamic password using received relevant parameters
530 decision diamond "Is authenticated with dynamic password?"
532 dynamic password
534 static password
535 authentication result
537 send authentication result decision diamond was authenticated mode dynamic password or static password
700 a third party system of hand shake 1000
800 an authorization server
900 a feed sharing server or restful feed sharing service
1000 Prior Art system of authorization handshake
1005 create OAuth2 or any other authentication handshake with business server
1010 create OAuth2 or any other authentication handshake with provider server
1020 Request from user to third party system
1030 redirect
1035 approve authorization
1040 response
1050 request access token
1055 response access token
1060 request sharing feed with token
1065 response sharing feed
1070 response Definitions Algorithm—A finite set of unambiguous instructions that, given some set of initial conditions, can be performed in a prescribed sequence to achieve a certain goal and that has a recognizable set of end conditions. A precise rule (or set of rules) specifying how to solve some problem; a set of procedures guaranteed to find the solution to a problem (The American Heritage® Dictionary of the English Language, 5th Edition.)

Authmode—delineates the method of authentication, via dynamic password or static password Biometric—is a way to measure the body and calculations as related to human form. Biometric authentication is used in computers to identify and control access.

Provider Application—or system operator application, a mobile app, desktop app, browser plug-in or other means of implementation of the disclosed embodiments Users—Consumers, business employees, business contractors, applications. All the entities that use a disclosed embodiment to login to a system site are sometimes called Users.

Dynamic Password—algorithm generated, unique, expiring, single use password for a particular business form and user log in combination.

Login process—includes a process by which Users can authenticate into a particular system, for a particular user login combination sometimes using the above defined "Dynamic Password."

Hashed password—A method of encrypting the password using password hashing algorithms (e.g.: MD5) that cannot be reverse engineered to the original state.

Business Login Form—each login form for each business 510

User Token—is a data element created by a service provider 410 or system operator and will contain information to identify a unique User along with token validity. This User Token has a User's or consumer's 210 information, special token code that allows a User to send to the Business 510 or vendor for authentication instead of using the User's username and password directly.

User ID—A user ID is a unique set of alphanumeric and special characters used to identify the User 210 or consumer for a Business Login Form.

NFC card—a NFC card or Near Field Communication card, allows communication between two electronic devices through a set of communication protocols usually at a distance of less than 1.57 inches.

Static password—is a User or consumer password which is reusable and may or may not expire.

PIN—is a secret number used by the User, e.g., bankcards have a PIN so the User can withdraw money from their account.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

The term "Provider Service" or system operator 410 may describe an owner, licensee, facilitator or operator of one or more of the disclosed embodiments.

Disclosed embodiments may include methods and systems wherein a user or consumer does not need to remember passwords of any website or app that the consumer may be seeking to access.

Disclosed embodiments may include three key participants or stakeholders in facilitating a seamless and effortless consumer experience. Such stakeholders may include 1. a facilitator, or system operator or provider service 410. 2. a consumer or end user 210; and 3. a business or vendor 510.

One stakeholder or participant may act as a facilitator or system operator 410 providing the disclosed services, sometimes described as "the disclosed embodiments" which is enabling an authentication of a consumer or user 210 by a vendor or business 510 in a manner in which the user or consumer does not need to remember any password with respect to that business' login requirements.

To deliver this experience, or disclosed embodiment 100 a system facilitator or system operator 410 may utilize a dynamically generated password based upon certain algorithms or logic that can be selected by the business or vendor. This password may be generated by the provider or system operator 410 and sent to the user or consumer terminal to be populated into the password entry field of the vendor's or business' website or app or device but the same password will also be simultaneously be generated at the business' system and a match will be done by the business' system of the password that its system generated and the one the business received from the user's or consumers 210 end.

Depending upon his/her choice, the user or consumer 210 will be enabled to use an NFC based authentication to add another layer of security to the authentication.

Implementations of some of the disclosed embodiments may be described as follows:

Business Login Form User Registration

The provider 410 via the provider service 400 will have received confirmations, either offline or online, be it realtime or in batches, from the businesses about their business login form User IDs. The provider service will provide the business with a mapped User Token for each user ID sent by the business for each business login form.

Business Login Form User ID Update

In the event a user changes the user ID, the business will update the provider with the User token, previous User ID and the current User ID to be updated in the provider database. The corresponding User token will not be changed.

Provider Application Login

User can login to "provider application" using biometric, NFC card, static password, pin and/or any other mode singly or combination.

Provider Application Initialization

Once a User is logged into the provider application, the provider application initializes the user settings saved by the User in the provider application. The provider application also synchronizes data from the server for this logged in User. Data being synchronized from the server includes, but is not limited to, currently active registered business login forms' data, currently dormant registered business login forms' data, and disabled registered business login forms' data. The business login form data will, at least, include the form fields for the business login form, the associated data for the form fields, and the URL for the ACTION (POST or GET). The data synchronization above will provide consistency in the User experience across all the provider applications, be it mobile, desktop, browser plugin etcetera. This will enable the User to get the latest registrations and related business login form data, should there be any changes in the database.

Provider Application Display

User sees a tabular list of businesses, the related login forms, and the User ID associated with the business login form. It must be noted that each User ID for each business and related login form is listed on a separate line with two buttons for each line, one each for Log in process and Display Password. The user is allowed to click on either of the two buttons on each line and correspondingly, either generate a dynamic password and directly login to the associated business application or to generate a dynamic password and display it to be used for logging into the business login form.

Provider Application Log in Process

When the User clicks on the Log In Process button of a business login form, the provider application invokes the Provider Service to generate a dynamic password, which is then used to create a HTTP_REQUEST and submit the request in POST method to help the User login directly into the business application.

Provider Application Display Password

When the User clicks on the Display Password button of a business login form, the provider application invokes the Provider Service to generate a dynamic password, which is then displayed to the User to be used to manually enter the dynamic password into the business login form.

Provider Service Dynamic Password Generation

The "dynamic password" is generated by Provider Service using dynamic secret parameters with varying algorithms, henceforth referred to as first set of parameters. Each algorithm will have an algorithm ID to identify the algorithm uniquely. Before the "dynamic password" is shared with User, a second set of parameters is generated, using the aforementioned first set of parameters, to be sent to the business. The second set of parameters, an algorithm ID and User token are transmitted to the business. The business then uses the received parameters to generate the same "dynamic password" above by the provider service application. The business will then hash this "dynamic password" and save any relevant data the business chooses to its database.

Business Authentication Using Unique, Expiring, Single-Use Password

The business login form is submitted manually or automatically containing the User ID and "dynamic password." The business reviews the data received from the business login form and hashes the received "dynamic password." The business then authenticates the User using its User ID and the above hashed "dynamic password" against the saved hashed "dynamic password" and User ID.

The "dynamic password" is going to be unique every immediate subsequent time hence not allowing anyone, be it Service provider application, Business, Users or any 3rd party to know what the next "dynamic password" will be.

The disclosed embodiments may also be described and/or implemented by reference to the drawings.

Other Prior Art Systems Sometimes Incorporated into the Disclosed Embodiments

The disclosed embodiments include more than just OAuth2 as a system of authentication and authorization between the various layers in the disclosed system because there are numerous other means and methods of authentication and authorization, depending on the businesses implementing the disclosed embodiments.

Authentication and authorization integrated into the disclosed embodiments may include use of by industry established protocols like OAuth1, OAuth2, JWT, SAML, OpenID, OpenID Connect, LDAP, Kerberos, RADIUS, XACML etc.

OAuth2 and JWT (JSON Web Token) are two commonly used technologies in modern web applications for authentication and authorization purposes. A brief description of each follows:

1. OAuth2:

OAuth2 is an open standard protocol that allows users to grant limited access to their resources on one website (known as the "resource server") to another website or application (known as the "client"), without sharing their credentials (username and password) directly. OAuth2 is widely used by social media platforms, APIs, and other web services.

Key Components of OAuth2:
- Resource Owner: The user who owns the resources being accessed.
- Client: The application or service that wants to access the user's resources.
- Authorization Server: Handles the authentication and authorization process. It verifies the user's identity and issues access tokens.
- Resource Server: Hosts the protected resources that the client wants to access on behalf of the user.
- Access Token: A token issued by the authorization server that represents the authorization granted to the client. The client includes this token in subsequent requests to access protected resources.

The OAuth2 flow typically involves the following steps:
1. The client requests authorization from the resource owner.
2. The resource owner grants authorization.
3. The client receives an authorization grant.
4. The client exchanges the authorization grant for an access token from the authorization server.
5. The client presents the access token to the resource server to access protected resources.

OAuth2 provides a standardized and secure way for users to grant access to their resources without sharing sensitive credentials with third-party applications.

2. JWT (JSON Web Token):

JWT is an open standard for securely transmitting information between two parties as a JSON object. It is commonly used for authentication and authorization in web applications and APIs. A JWT consists of three parts: header, payload, and signature, each encoded as Base64 strings and concatenated with dots.

- Header: Contains information about the type of token and the signing algorithm used.
- Payload: Contains the claims or statements about the user and additional metadata. Claims can include user identification, roles, permissions, and other relevant data.
- Signature: A hash of the encoded header, payload, and a secret key. It is used to verify the integrity of the token and ensure that it hasn't been tampered with.

JWTs are typically issued by an authentication server (such as an OAuth2 authorization server) after successful authentication. The client receives the JWT and includes it in subsequent requests as a means of authentication. The server can validate the JWT by verifying its signature and checking the claims within it. JWTs are self-contained, meaning the server can validate them without the need for a centralized session store.

JWTs provide a stateless and scalable approach to authentication, as the server can validate tokens without the need for database lookups or session management. They are widely used in token-based authentication systems and as a secure means of transmitting user information between services.

Both OAuth2 and JWT are important technologies in modern web development, and they often work together. OAuth2 provides the framework for user authorization, while JWTs can be used as the access tokens issued by the authorization server for subsequent authenticated requests.

In addition to OAuth2 and JWT, there are several other technologies and protocols commonly used for authentication and authorization in web applications. Here are a few notable ones:

1. OpenID Connect (OIDC): OIDC is an authentication layer built on top of OAuth2. It provides a standardized way to authenticate users and obtain identity information about them. OIDC adds an ID token to the OAuth2 flow, which contains user identity information in the form of a JWT.

2. SAML (Security Assertion Markup Language): SAML is an XML-based protocol for exchanging authentication and authorization data between an identity provider (IdP) and a service provider (SP). It enables single sign-on (SSO) across multiple applications and domains.

3. LDAP (Lightweight Directory Access Protocol): LDAP is a protocol used for accessing and managing directory services. It is commonly used for centralized authentication and authorization in enterprise environments. LDAP directories store user credentials and access control information.

4. Kerberos: Kerberos is a network authentication protocol that provides secure authentication for client-server applications. It uses symmetric key cryptography to verify the identity of users and protect data during communication.

5. RADIUS (Remote Authentication Dial-In User Service): RADIUS is a client-server protocol used for authentication, authorization, and accounting (AAA) services. It is commonly used in network access control scenarios, such as dial-up or VPN connections.

6. OpenID: OpenID is an older protocol for user authentication that has been largely superseded by OpenID Connect. It allows users to use their existing accounts from OpenID providers to log in to multiple websites without the need for separate usernames and passwords.

7. XACML (extensible Access Control Markup Language): XACML is an XML-based language for expressing fine-grained access control policies. It provides a standardized way to define and enforce access control rules in distributed systems.

8. OAuth1: While OAuth2 is more commonly used today, OAuth1 is an older version of the OAuth protocol. It provides similar capabilities for authorization, but with slightly different mechanics. OAuth1 relies on digital signatures for securing requests.

These are just a few examples of the technologies and protocols used for authentication and authorization. The choice of technology depends on factors such as the specific use case, security requirements, compatibility with existing systems, and the preferences of the development team.

NFC Card as a Layer of MFA

NFC (Near Field Communication) cards can provide additional security to users in several ways:

1. Two-factor authentication: NFC cards can be used as a second factor of authentication along with a password or PIN. By requiring both the physical card and a personal identifier, such as a PIN, it adds an extra layer of security. This reduces the risk of unauthorized access, as an attacker would need both the card and the associated information to gain entry.

2. Secure storage: NFC cards can securely store sensitive information, such as encryption keys or digital certificates. This prevents unauthorized access to the stored data, reducing the risk of data theft or tampering.

3. Contactless transactions: NFC cards are often used for contactless payments, such as mobile wallets or transit cards. These transactions use encryption and tokenization techniques to protect the user's financial information. The card generates a unique transaction code for each payment, which reduces the risk of interception or cloning of the card details.

4. Physical proximity requirement: NFC operates over a short range (typically a few centimeters), requiring physical proximity between the card and the reader. This helps prevent remote attacks or interception of data during transmission. The close proximity requirement makes NFC cards more secure than other wireless communication methods like Bluetooth or Wi-Fi.

5. Encryption and authentication protocols: NFC cards use encryption algorithms and authentication protocols to ensure secure communication between the card and the reader. These protocols verify the authenticity of the card and protect the integrity of the transmitted data, making it difficult for attackers to intercept or modify the information.

6. Tamper-resistant hardware: Many NFC cards incorporate tamper-resistant features, such as secure elements or chips. These components are designed to resist physical attacks, such as tampering, reverse engineering, or extraction of sensitive information from the card's memory. This enhances the overall security of the card and protects against unauthorized access to the stored data.

While NFC cards can provide additional security, it's important to note that no security measure is completely foolproof. Users should still follow best practices, such as keeping their cards secure, not sharing sensitive information, and regularly monitoring their card activity for any suspicious transactions.

Technically, NFC (Near Field Communication) cards work based on a combination of radio frequency identification (RFID) and contactless smart card technologies. Here's a simplified explanation of how NFC cards work:

1. Communication: NFC cards rely on electromagnetic induction for communication. They contain an embedded NFC chip and an antenna, typically embedded in the card itself. The card's antenna allows it to establish a communication link with an NFC-enabled reader or device. NFC cards use inductive coupling for communication.

2. Passive operation: NFC cards operate in a passive mode, meaning they do not require an internal power source like a battery. Instead, they draw power from the electromagnetic field generated by the NFC reader or device during communication.

3. Radio frequency range: NFC operates within the high-frequency (HF) range, typically around 13.56 MHz. This frequency range allows for short-range communication, typically up to a few centimeters, making NFC a proximity-based technology.

4. Data exchange: NFC cards can exchange data with an NFC reader using one of three modes: reader/writer mode, peer-to-peer mode, or card emulation mode.

Reader/writer mode: The NFC card acts as a passive tag, and the NFC reader (like a smartphone or a dedicated reader device) initiates communication. The reader sends commands or requests to the card, which responds with the requested data.

Peer-to-peer mode: In this mode, two NFC-enabled devices, such as two smartphones, can communicate with each other. They can exchange data bidirectionally, enabling functions like file transfer or sharing information.

Card emulation mode: The NFC card emulates a contactless smart card, such as a credit card or transit card. When an NFC reader interacts with the card, it recognizes it as if it were a physical card. This allows the NFC card to be used for contactless payments or access control.

NFC cards use different protocols for data exchange. The most common ones are:

a. ISO/IEC 14443: This protocol is used for contactless smart cards and is widely adopted in NFC-enabled devices. It specifies the communication protocols and data transmission methods.

b. ISO/IEC 18092: This protocol is specifically designed for NFC communication, enabling interoperability between NFC devices. It defines the data exchange format and communication modes.

5. Security features: NFC cards incorporate various security features to protect data during communication. These include encryption algorithms, authentication protocols, and secure storage for sensitive information. Encryption ensures that the data transmitted between the card and the reader remains confidential, while authentication protocols verify the authenticity of the card and protect against unauthorized access.

6. Applications: NFC cards are used in various applications, including contactless payments, access control systems, public transportation fare collection, loyalty programs, and more. The specific functionality and applications depend on the capabilities and programming of the NFC card.

Overall, NFC cards provide a convenient and secure method for short-range wireless communication, enabling various applications that require secure data exchange and authentication. They use electromagnetic fields and radio frequency communication to enable wireless data transfer between the card and an NFC-enabled device. They can operate in card emulation mode, behaving like a contactless smart card, or in reader/writer mode, interacting with other NFC-enabled devices or tags. The communication occurs at a specific frequency, and data exchange is facilitated through standardized protocols while maintaining security through encryption and authentication.

Figure 1:
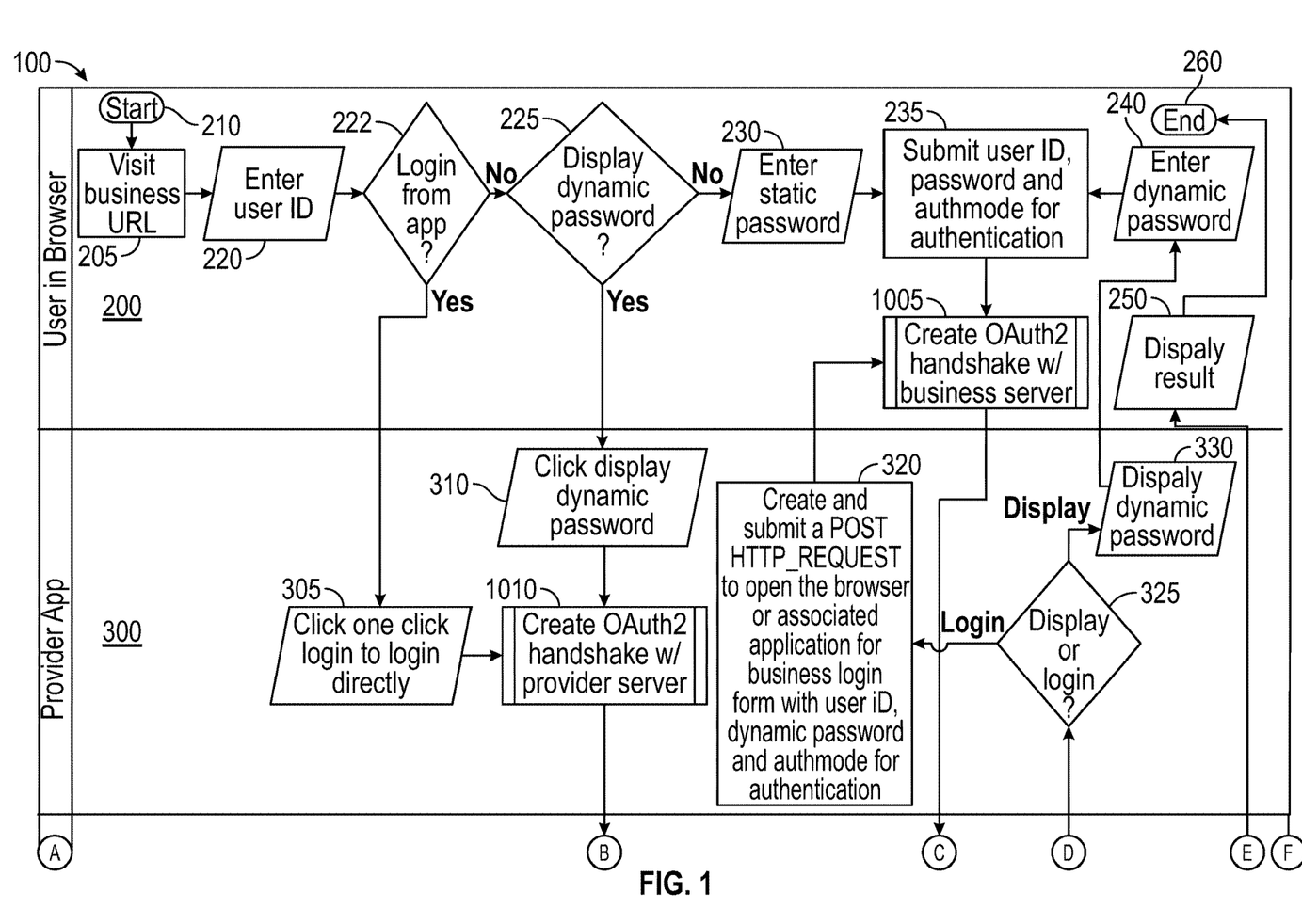
FIG. 1 depicts a flow chart of a disclosed embodiment and interactions between consumers, vendors and system operators FIG. 2 (Prior Art) depicts a flow chart of an authorization exchange or handshake
Figure 2:
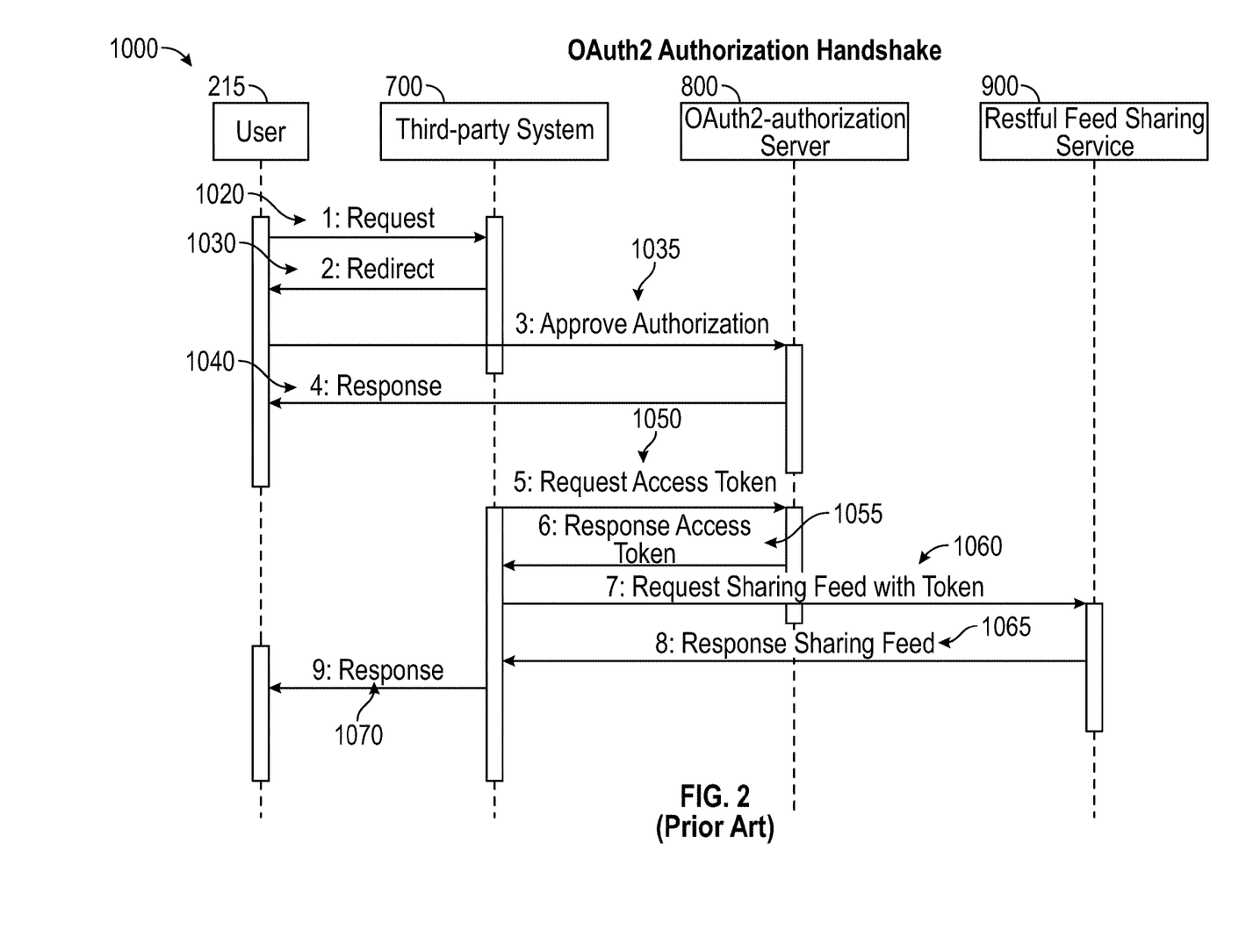

Referring to FIG. 1, a system 100 in general may be described from many starting points, including a starting point wherein a consumer or user 210 work within a user browser 200 and visits a business URL or website 205, the user or consumer then enters a user ID 220, a decision diamond 222 of logging in from an app is made, if the consumer did not log in from an app a display dynamic password decision diamond 225 is made.

At the dynamic password decision diamond 225, if there is no display of a dynamic password, a user is directed to an enter static password mode 230, wherein a static password is entered. A user may then submit a user ID, password and authmode for authentication 235. At this juncture, 235 a user or consumer may use a prior art system, and create a handshake 1005 with a business. For purposes of illustration an OAuth2 system is shown, but, as described above the use of any prior art system is contemplated.

Following arrow C at 1005, a business 510 may implement a authentication mode decision 550. If a static password is sued 534 a decision "is authenticated with static password? is entered 540, an authentication result may be found 535 and sent.

A user may login from an application or app 222 and be directed to a one click or direct login 305 found in the provider application 300. After such a login command 305 an authentication or handshake 1010 with a provider server may be instigated. Following label B, into a provider service 410, a function 420 of generating a dynamic password and secrete token using a user token and sometimes other parameters may be performed.

A provider app 300 or application may include a direct one click login function 305, a click display dynamic password function 310 or interface, a create handshake with provider server function 1010, a create and submit a POST HTTP Request to open a browser or associated application for business login from with user ID, dynamic password and authmode for authentication function 320.

A provider service 410 may include functions, such as creating a handshake with a 1005 with a business server, an active handshake decision diamond 415, a generate dynamic password and section toke using a user token function 420 and a send relevant parameters to recreate a dynamic password function 430.

A business system 510 or functions applicable to a business subscribing to a disclosed embodiment may include a recreate and save a dynamic password using received parameters 520.

What is claimed is:

1. A system, comprising:

a server implemented using one or more processors; and a memory storing instructions which, when executed by the one or more processors, cause the server to:

output a listing of participating businesses, and a generate password command for a business selected from the listing of participating businesses;

generate a first set of system parameters using a specific algorithm selected from a plurality of algorithms, wherein the specific algorithm has a specific algorithm identifier;

derive a second set of system parameters from the first set of system parameters, wherein the second set of system parameters are mathematically related to but distinct from the first set of system parameters;

generate, based on the first set of system parameters, a first unique password for a consumer in response to the consumer activating the generate password command for the selected business;

transmit the second set of system parameters and the specific algorithm identifier to the selected business in real-time, wherein the selected business generates a second unique password using the second set of system parameters and the specific algorithm corresponding to specific algorithm identifier; and enable communication between the consumer and the selected business after confirming a match of the first and second unique passwords.

2. The system of claim 1, wherein the instructions, when executed by the one or more processors, cause the server to transmit a user token to the selected business.

3. The system of claim 2, wherein the selected business hashes the second unique password to save selected customer data to a business database, and wherein the selected consumer data includes the user token.

4. The system of claim 3, wherein the selected business hashes the user token to equate against the hashed second unique password.

* * * * *